(No Model.)
J. S. SELLON.
SECONDARY BATTERY.
No. 383,193. Patented May 22, 1888.
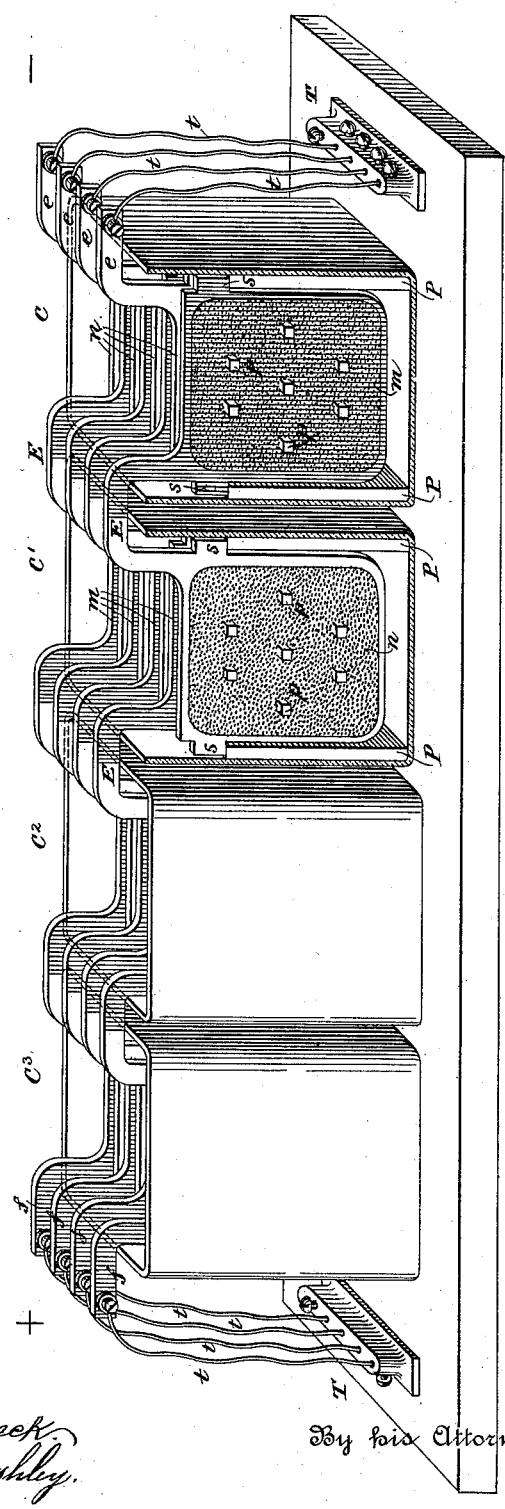
Witnesses.
Geo. W. Breck
Carrie E. Ashley
Inventor,
John S. Sellon,
By his Attorney Wm. B. Vansize

UNITED STATES PATENT OFFICE.

JOHN S. SELLON, OF SYDENHAM, COUNTY OF KENT, ENGLAND, ASSIGNOR TO THE ELECTRICAL ACCUMULATOR COMPANY, OF NEW YORK.

SECONDARY BATTERY.

SPECIFICATION forming part of Letters Patent No. 383,193, dated May 22, 1888.

Application filed November 8, 1887. Serial No. 254,615. (No model.) Patented in England August 22, 1887, No. 11,448.

*To all whom it may concern:*

Be it known that I, JOHN SCUDAMORE SELLON, a subject of the Queen of Great Britain and Ireland, and a resident of Sydenham, in the county of Kent, England, have invented certain new and useful Improvements in Secondary Batteries, (for which I have made application for Letters Patent in Great Britain, No. 11,448, dated August 22, 1887,) of which the following is a specification.

My invention is an improvement in secondary batteries; and it consists in a construction and arrangement of the elements, whereby any individual member or one element of a series may be removed without disturbing the remaining elements, or interrupting the continuity of the circuit in which the battery is located. I construct a pair or couple from one integral sheet, plate, or casting of metal, the two divisions being located in one and the same plane. The positive element or division I place in one inclosing-cell and the negative in a second cell. A second couple is placed in position in a parallel plane, with its negative element or division in the first-named cell and its positive element or division in the second cell, and I continue to add couples arranged alternately in this way until the desired cell capacity is obtained, each couple being independent both mechanically and electrically, so that should any element of a cell become impaired in any way it may be removed and substituted without disturbing the remaining elements or interrupting the operation of the battery.

I prefer to form each and every element with one or more shoulders or projections, and I place one or more rests or projections in or upon the inclosing-cell in such position that the elements are held suspended above the bottom of the cell.

The accompanying drawing illustrates my invention.

E is a pair or couple of elements formed from one integral plate, sheet, or casting of metal—as lead—and having holes, cavities, perforations, or receptacles within which the active material is placed. Thus the portion $m$ furnishes a support for peroxide of lead, and the portion $n$ furnishes a support for spongy metallic lead. These are, respectively, electro-negative and electro-positive.

The elements or couples E are shaped with shoulders or projections $s$ $s$, preferably near their upper edges, and projections P are placed in or upon the inclosing-cells C C' in position to afford a rest for the shoulders $s$, the height of projections P being sufficient to hold the couples E out of contact with the bottom of the cell, affording a free circulation for the electrolytic liquid, and preventing any possible accumulation of conducting material in the bottom of the cell from forming a connection between two adjacent elements. Plugs of insulating material, $p$, are fixed in position in the elements and serve as separators to prevent the elements coming into contact with each other. Any other suitable form of separator may be used.

A series of couples E are placed in cells C and C', the divisions $m$ being in cell C and the divisions $n$ in the cell C'. They are arranged in parallel planes. Each couple is independent. A second series of couples E is placed in cells C' and $C^2$, the divisions $m$ thereof in cell C' alternating with the divisions $n$ of the first series. A third series of couples is similarly arranged in cells $C^2$ and $C^3$, and so on until the desired number of cells in series is obtained. The terminal cells have single elements $e$ or $f$ alternating with the elements of that cell. These are electrically connected together and to a common terminal, T, by wires or connections $t$.

Couples E may be added or subtracted from the series of cells at pleasure, either for the purpose of substituting a perfect couple for imperfect or damaged elements, to vary the capacity of a cell, or to charge the couples in an independent tank or vat, should circumstances render such action economical or desirable, and such changes or substitutions may be made without disturbing the remaining elements or couples and without disturbing the electrical continuity.

What I claim, and desire to secure by Letters Patent, is—

1. The combination of two inclosing-cells, a positive element consisting of two or more plates, and a negative element consisting of two or more plates alternating therewith in each cell, each negative plate in one cell being independently connected to a positive plate in the adjoining cell, both located in the same plane, whereby any pair of plates may be removed without disturbing the remaining parts of the element.

2. The combination of two inclosing-cells and two or more couples, each couple formed from one integral sheet, plate, or casting of metal, the two sections being located in two cells, respectively, but in one and the same plane.

JOHN S. SELLON.

Witnesses:
FRED GOATER,
S. B. PEECH,
*Clerks to John Newton & Sons, 9 Birchin Lane, London.*